United States Patent
Kjær et al.

(10) Patent No.: US 10,364,798 B2
(45) Date of Patent: Jul. 30, 2019

(54) CONTROL SYSTEM FOR WIND TURBINES FOR REDUCING DISTURBANCES IN AN ELECTRICAL GRID

(71) Applicant: VESTAS WIND SYSTEMS A/S, Aarhus N (DK)

(72) Inventors: Martin Ansbjerg Kjær, Harlev J (DK); Fabio Caponetti, Aarhus C (DK); Ian Couchman, Horley (GB); Jesper Sandberg Thomsen, Hadsten (DK); Thomas Krüger, Aarhus C (DK); Jorge Martinez Garcia, Seville (ES)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/518,992

(22) PCT Filed: Oct. 8, 2015

(86) PCT No.: PCT/DK2015/050304
§ 371 (c)(1),
(2) Date: Apr. 13, 2017

(87) PCT Pub. No.: WO2016/058610
PCT Pub. Date: Apr. 21, 2016

(65) Prior Publication Data
US 2017/0226988 A1    Aug. 10, 2017

(30) Foreign Application Priority Data
Oct. 13, 2014    (DK) .................................. 2014 70633

(51) Int. Cl.
*F03D 7/02* (2006.01)
*F03D 7/04* (2006.01)
(Continued)

(52) U.S. Cl.
CPC .......... *F03D 7/0284* (2013.01); *F03D 7/0296* (2013.01); *F03D 7/048* (2013.01);
(Continued)

(58) Field of Classification Search
CPC ...... F03D 7/0284; F03D 7/0296; F03D 7/048; H02K 7/183; H02P 9/04
See application file for complete search history.

(56) References Cited

U.S. PATENT DOCUMENTS 8,659,178 B2 *  2/2014  Arlaban Gabeiras .......................
F03D 7/0284
290/44
2006/0066111 A1  3/2006  Suryanarayanan et al.
(Continued)

FOREIGN PATENT DOCUMENTS

EP    2754889 A1    7/2014

OTHER PUBLICATIONS

International Search Report for PCT/DK2015/050304, dated Jan. 12, 2016.
Danish Search Report for PA 2014 70633, dated May 13, 2015.

*Primary Examiner* — Viet P Nguyen
(74) *Attorney, Agent, or Firm* — Patterson + Sheridan, LLP (57) ABSTRACT

The invention relates to a method for wind turbine generators for reducing electrical disturbances in the form of power variations which are caused by damping controllers arranged the compensate structural oscillations by inducing shaft torque variations. The shaft torque variations are generated by imposing corresponding variations in a generator set-point, e.g. a power or torque set-point. Variations in the generator set-point cause undesired variations in the power injected to the grid by one or more wind turbine generators. According to an embodiment of the invention the electrical disturbances may be reduced by limiting a damping controller's control action. The amount of limitation or restriction of the damping controller may be determined on basis on electrical disturbance information determined from power measured e.g. at a location on the grid.

17 Claims, 5 Drawing Sheets

(51) Int. Cl.
*H02K 7/18* (2006.01)
*H02P 9/04* (2006.01)

(52) U.S. Cl.
CPC .............. *H02K 7/183* (2013.01); *H02P 9/04* (2013.01); *F05B 2260/96* (2013.01); *F05B 2260/964* (2013.01); *F05B 2270/334* (2013.01); *F05B 2270/337* (2013.01); *Y02E 10/723* (2013.01)

(56) References Cited

U.S. PATENT DOCUMENTS

| | | |
|---|---|---|
| 2008/0067815 A1 | 3/2008 | Suryanarayanan et al. |
| 2010/0013235 A1 | 1/2010 | Bjerge et al. |
| 2010/0072751 A1 | 3/2010 | Andersen et al. |
| 2010/0219634 A1 | 9/2010 | Arlaban Gabeiras et al. |
| 2010/0283247 A1* | 11/2010 | Krueger ............... F03D 7/0272 290/44 |
| 2011/0140428 A1* | 6/2011 | Wakata ................ F03D 7/0284 290/44 |
| 2012/0139243 A1* | 6/2012 | Koerber ............... F03D 7/0284 290/44 |
| 2012/0200087 A1* | 8/2012 | Schindele ............ F03D 7/0296 290/44 |
| 2012/0205911 A1* | 8/2012 | Deng .................... H02M 5/45 290/44 |
| 2014/0032000 A1* | 1/2014 | Chandrashekhara ... H02J 3/382 700/292 |
| 2015/0008672 A1* | 1/2015 | Garcia ................. H02J 3/24 290/44 |
| 2015/0035281 A1* | 2/2015 | Lopez Rubio ........ F03D 7/0224 290/44 |

* cited by examiner

CONTROL SYSTEM FOR WIND TURBINES FOR REDUCING DISTURBANCES IN AN ELECTRICAL GRID

FIELD OF THE INVENTION

The invention relates to control of at least one wind turbine, particularly to controlling a damping controller of one or more wind turbines.

BACKGROUND OF THE INVENTION

Structural oscillations in wind turbines caused e.g. by the wind may be damped actively by generating counteracting oscillations. Such counteracting oscillations may be generated by inducing variations in the shaft torque, e.g. by varying a power or torque set-point for the generator of the wind turbine. The variations may be generated by a damping controller.

In order to improve performance of the wind turbine there is a need to improve control of damping controllers.

SUMMARY OF THE INVENTION

It is an object of the invention to improve the control of a wind turbine in relation to damping of a wind turbine.

It is a further object of the invention to reduce electrical disturbances in the grid which are caused by wind turbines.

In a first aspect of the invention there is provided a method for controlling at least one wind turbine for reducing spectral disturbances in an electrical grid, the at least one wind turbine comprises

- a rotor adapted to drive a power generator via a shaft, wherein the generator is connectable with the electrical grid, and
- at least one damping controller configured to compensate structural oscillations of the wind turbine by controlling a torque on the shaft, wherein the at least one damping controller is configured to set a limit of the control action on the shaft dependent on a restriction value, wherein the method comprises
- determining disturbance information describing an electrical disturbance at a point of measurement electrically connected to the wind turbine,
- determining the restriction value based on the determined disturbance information,
- assigning the restriction value to the damping controller for setting the limit of the control action.

Advantageously, the control action performed by damping controllers may be restricted dependent on measured disturbance information determined from measured power at a point of measurement. Accordingly, if the disturbance information indicates disturbances, e.g. power variation amplitudes at a given frequency, above a given threshold, a limitation of the damping control action may be invoked in order to avoid or at least reduce further increases in the disturbance information.

Each wind turbine may comprise one damping controller arranged to damp a specific structural oscillation or a plurality of damping controllers arranged to damp different structural oscillations. The determined restriction value may be determined for one of the one or more damping controllers of a wind turbine. Accordingly, a plurality of restriction values, possibly different restriction values, may be determined for a plurality of damping controllers of a wind turbine.

The said point of measurement for the electrical disturbance may be located anywhere on an electrical power connection between and including the output of the wind turbine and the electrical grid. In other embodiments, the said point of measurement for the electrical disturbance may be located anywhere on an electrical power connection between the wind turbine—but not including the direct output of the wind turbine—and the electrical grid. The point of measurement may comprise a power meter capable of measuring the active power. The electrical grid may be shortly defined as an interconnected electrical network for delivering electricity from one point, e.g. a power source, to another point, e.g. a consumer. The electrical grid can have different voltage levels, e.g. for transmission and distribution. In context of the present invention, the electrical grid may sometimes for short be termed 'the grid'. In some embodiments, the said point of measurement for the electrical disturbance may be located in, or near, the electrical grid, in particular in, or near, the point of connection (PoC) between the at least one wind turbine with the electrical grid.

In the case of a plurality of wind turbines, a plurality of restriction values, possibly different restriction values, may be determined for a plurality of damping controllers or the plurality of wind turbines. Accordingly, a plurality of restriction values may be assigned to the plurality of damping controllers of the wind turbines. In embodiments with a plurality of wind turbines, it may be particular advantageous that said point of measurement for the electrical disturbance may be located in, or near, the electrical grid, in particular in, or near, the point of connection (PoC) between the plurality of wind turbines and the electrical grid.

It should be noted that the present invention is particularly advantageous when a plurality of wind turbines, e.g. a so-called 'wind park' or 'wind farm', is controlled according to the invention because combined oscillations of the wind turbines are normally not in phase, and therefore the combined contribution of these oscillation to the electrical disturbance in the grid could be lower than the simple sum, but nevertheless there may be a significant electrical disturbance worth reducing with the present invention by measuring in, or near, the electrical grid, particular in, or near, the point of connection (PoC) between the plurality of wind turbines and the electrical grid.

According to an embodiment the method further comprises selecting at least one of the damping controllers based on the disturbance information, and assigning the restriction value to the selected damping controller.

The disturbance information may contain information such an spectral information which may be used to identify a particular damping controller and disturbance levels which may be used to determine if the disturbance is significant enough to invoke a restriction in the damping activity of the particular damping controller by selecting that particular controller.

According to an embodiment the method further comprises selecting at least one of the damping controllers based on damping compensation values describing levels of damping compensation performed by the damping controllers, and assigning the restriction value to the selected damping controller.

The damping compensation values may be used to identify which damping controller induces the largest shaft torque variations. These controllers may be selected for restricting the damping activity of the most active damping controllers. According to an embodiment the damping compensation values are determined based on output values from the damping controllers.

A damping controller may further be selected based both on damping compensation values and disturbance information so that the restriction value can be assigned to the selected damping controller.

According to the embodiments which comprise selection of at least one of the damping controllers based on disturbance information and/or damping compensation, the plurality of damping controllers may by comprised by a single wind turbine or a plurality of wind turbines. In the case were each of a plurality of wind turbines comprises one or more damping controllers, the selection of the at least one damping controller, and assignment of one or more restriction values, may be performed among the damping controllers of the plurality of wind turbines. This may involve an initial selection of one or more wind turbines which contains damping controllers to be restricted. However, selection of damping controllers could also be performed directly when the control system for controlling the at least one wind turbine is able to receive damping compensation values from damping controllers from different wind turbines and/or contains information, e.g. information about spectral location of power variation peaks, which enables selection of the damping controllers from different wind turbines based on the disturbance information.

According to an embodiment the method further comprises determining wind turbine restriction values based on the restriction value for a plurality of the wind turbines, assigning the turbine restriction values to the wind turbines, and assigning the turbine restriction value for one of the wind turbines to the damping controller of the wind turbine for setting the limit of the control action.

Advantageously, in a wind turbine park comprising a plurality of wind turbines supplying power to the grid, the restriction value, i.e. the total restriction value, is divided into wind turbine restriction values for one or more of the wind turbines.

The wind turbine restriction values may be determined simply by dividing the total restriction value equally between the wind turbines, or by other methods, e.g. dependent on the damping activity performed by individual wind turbines or dependent on the disturbance information, e.g. spectral locations of disturbance peaks in an amplitude spectrum. The determined individual wind turbine restriction values are assigned to the one or more damping controllers of each of the wind turbines which have been provided with a wind turbine restriction value.

According to an embodiment the method further comprises selecting at least one of the wind turbines based on the disturbance information, and assigning the wind turbine restriction values to the selected wind turbines. Alternatively or additionally, the method may further comprise selecting at least one of the wind turbines based on damping compensation values describing levels of damping compensation performed by the damping controllers of the wind turbines, and assigning the turbine restriction values to the selected wind turbines. Accordingly, wind turbine may also be selected based on a combination of disturbance information and damping compensation values.

According to an embodiment the restriction value, i.e. the total restriction value, is determined as a function of a difference between a disturbance value determined from the disturbance information and a desired disturbance value. Accordingly, the restriction value may be determined so that the damping controllers are continuously restricted, if required, to keep the disturbance value at an acceptable level.

According to an alternative embodiment the restriction value is determined by comparing a disturbance value determined from the disturbance information with predetermined one or more predetermined threshold values.

It is understood that the disturbance information may comprise spectrally resolved disturbance information, e.g. an amplitude spectrum containing the spectral distribution of power variation amplitudes within a frequency range.

A second aspect of the invention relates to a control system for controlling at least one wind turbine for reducing spectral disturbances in an electrical grid, the at least one wind turbine comprises a rotor adapted to drive a power generator via a shaft, wherein the generator is connectable with the electrical grid, and at least one damping controller configured to compensate structural oscillations of the wind turbine by controlling a torque on the shaft, wherein the at least one damping controller is configured to set a limit of the control action on the shaft dependent on a restriction value, wherein the control system comprises a detector configured to determine disturbance information describing an electrical disturbance at a point of measurement electrically connected to the wind turbine, a compensation controller configured to determine the restriction value based on the determined disturbance information, and to assign the restriction value to the damping controller for setting the limit of the control action.

According to an embodiment the control system further comprises a distributor configured to assign the restriction value to at least one of the damping controllers.

According to an embodiment the control system further comprises a wind turbine distributor configured to determine wind turbine restriction values based on the restriction value for a plurality of the wind turbines, and to assign the turbine restriction values to the wind turbines.

A third aspect of the invention relates to a wind turbine comprising a control system according to the second aspect.

A fourth aspect of the invention relates to a power plant controller adapted to control a plurality of wind turbines in a wind park, the power plant controller comprises a control system according to the second aspect.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
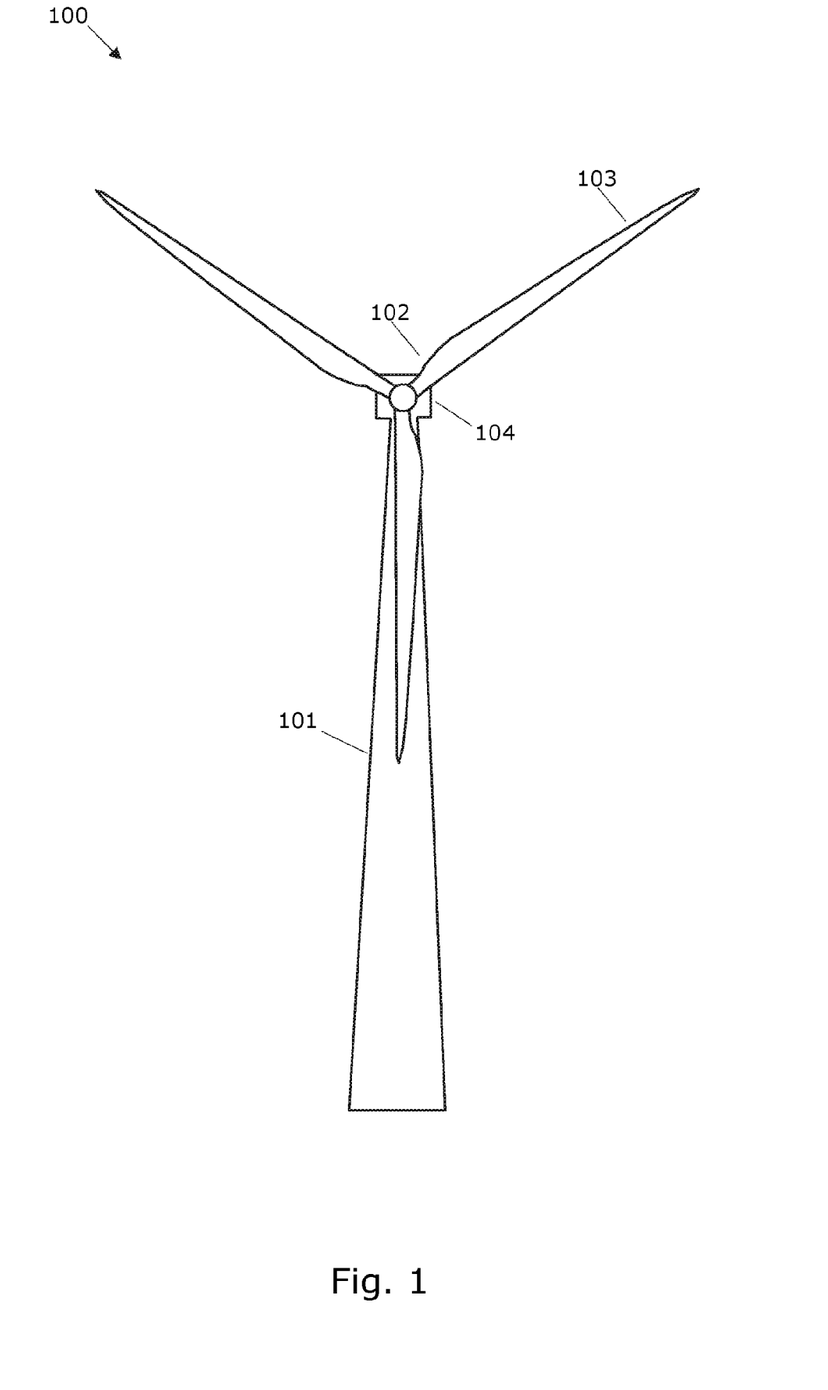
FIG. 1 shows a wind turbine.

FIG. 1 shows a wind turbine 100 comprising a tower 101 and a rotor 102 with at least one rotor blade 103, such as three blades. The rotor is connected to a nacelle 104 which is mounted on top of the tower 101 and being adapted to drive a generator situated inside the nacelle. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. In this document the wind turbine 100 may also be referred to with the common abbreviation WTG (Wind Turbine Generator).

According to an embodiment, the wind turbine 100 may be configured so that the torque on the shaft and/or the electric power produced by the generator can be controlled via a control input to the generator, e.g. via a control input to a power invertor or power converter connected electrically connected to the generator. The control input may be in the form of a power reference or a torque reference. The control input may be supplied directly to the generator, invertor or converter, or indirectly via a power controller or a torque controller which controls the generator. In addition, also the pitching of the blades are controlled in order to control the rotation speed of the shaft.

Structural components of the wind turbine such as the tower may be influenced by the wind and other effects to oscillate. Such structural oscillations affects the structural components with fatigue loads and, therefore, it may be desired to damp such oscillations.

In an embodiment the wind turbine comprises a damping controller (see damping controller 414-416 in FIG. 4) configured to damp structural oscillations by inducing variations in the shaft torque. The torque variations cause structural oscillations in structural components. It is possible to damp the undesired oscillations by inducing torque variations which generate structural oscillations which counteracts the undesired oscillations. The torque variations can be created in response to variations in the control input for the generator (i.e. the control input in the form of a power reference or a torque reference).

For example, the damping controller may be tower damping controller configured to damp tower oscillations. The tower damping controller may configured to modify a power control input, i.e. a power set-point, to the generator so that the control input comprises sinusoidal variations. The variations in the control input generate variations in the shaft torque which generate tower oscillations having a frequency and phase which counteracts the wind-induced tower oscillations.

Since the control input for the generator contains variations, the power generated by the generator varies in response the control input variations. The power from the generator and, therefore, also the power variations, are supplied to the grid. Certain amplitudes of power variations may be acceptable, but generally variations in the power output due to torque damping activities from a wind turbine are undesired.

Figure 2:
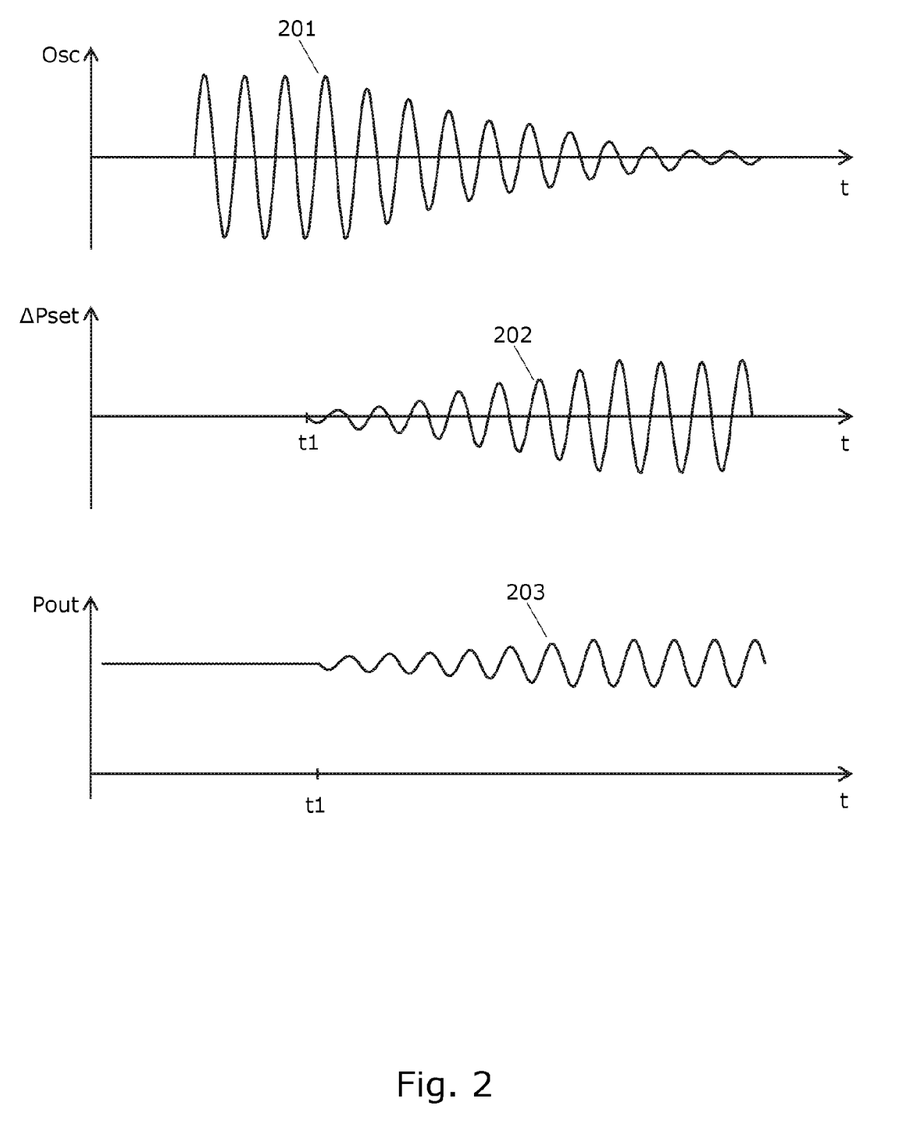
FIG. 2 illustrates an example of structural oscillations and variations in shaft torque and generator power.

FIG. 2 illustrates an example of structural oscillations 201 (Osc) as a function of time t, such as tower top lateral vibrations. The oscillations 201 are damped by inducing torque variations 202 in the shaft from time t1. The torque variation may be set-point variations (ΔPset) super-imposed onto the power set-point signal.

The signal 202 may reflect the power set-point variation (ΔPset) to be super-imposed onto the power set-point to counter the tower vibrations of 201. The torque variations will in itself induce structural oscillations, which when properly timed will counteract the structural oscillations 201, via structural oscillations induced by the torque variations and, therefore, the structural oscillations start to decay after time t1. Since the torque variations in the shaft are generated by the generator, e.g. by varying the power set-point, the amplitude of the power from the generator Pout varies correspondingly with the torque variations and with the same or substantially the same frequency. The variations in the power output 203 is illustrated with an exaggerated amplitude of the variations.

The power variations 203 caused by a damping controller may have a particular frequency or may have a spectral range corresponding to the spectral range of the control signal generated by the damping controller. A wind turbine 100 may have more than one damping controller where each damping controller may be configured to damp different structural oscillations. Accordingly, different damping controllers of a wind turbine generator may generate power variations 203 having different spectral ranges.

Herein the term "spectral range" or "spectrum" refer to a range of frequencies describing frequencies of the control signal, generator power, power variations or other parameters relating to physical quantities. Accordingly, a "spectral range" may also be referred to as a frequency range and a spectrum may also be referred to as a frequency spectrum.

The power variations 203 caused by damping controllers, i.e. power variations in a spectral range, are also referred to as spectral disturbances 203 or power disturbances 203 since they appear as disturbing power variations in particular spectral ranges, typically at frequencies below 2 Hz. The spectral disturbances may be present in the electrical grid or other power lines connected with a wind turbine, e.g. power lines connecting wind turbines with the grid.

Figure 3:
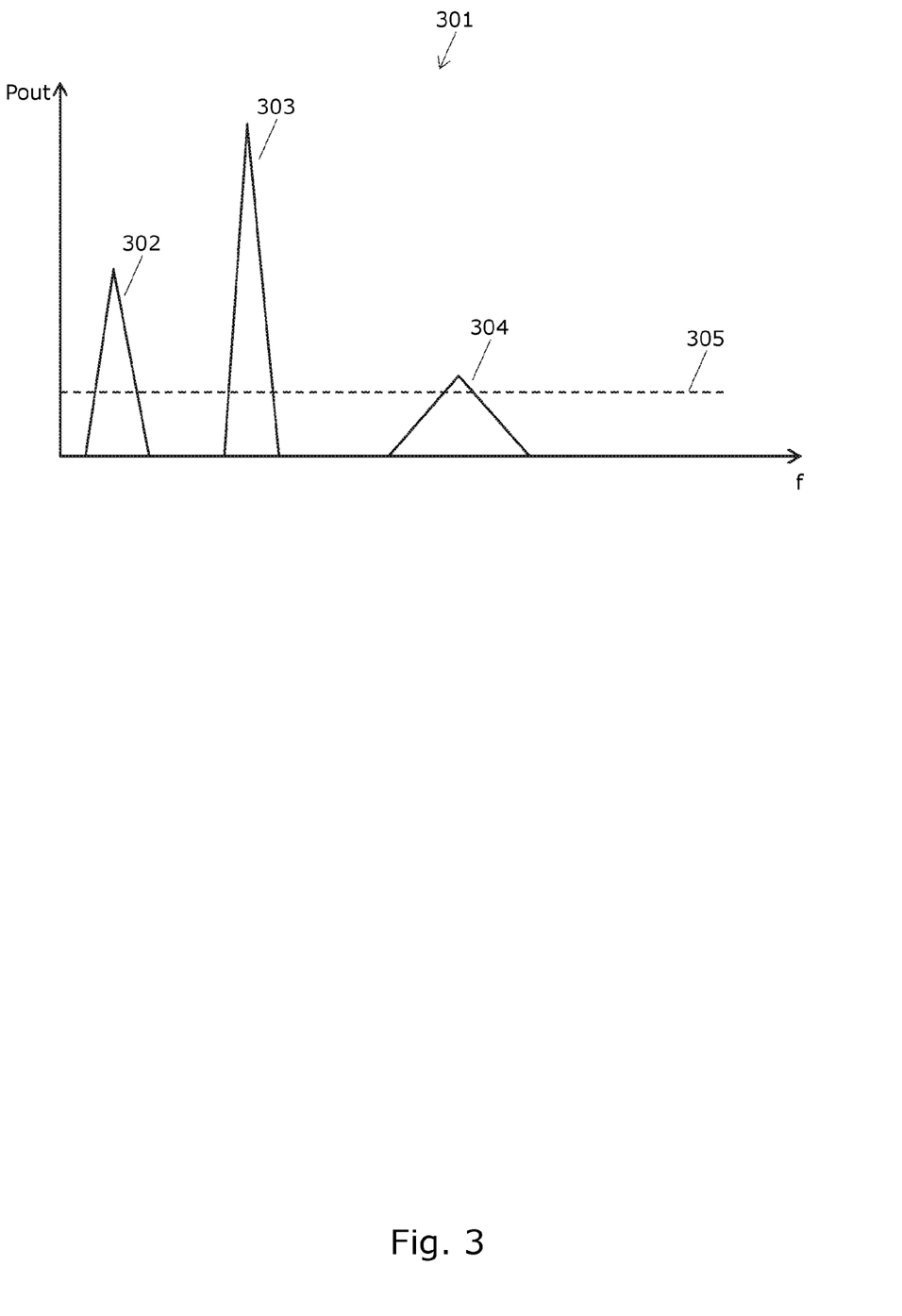
FIG. 3 illustrates an amplitude spectrum of power variations from a generator

FIG. 3 shows a schematic example of an amplitude spectrum 301 of amplitudes Pout of power variations 202 within a frequency spectrum or frequency band between 0 and 2 Hz. The different amplitude peaks 302-305 may correspond to spectral disturbances due to damping actions from different damping controllers. FIG. 3 also shows a threshold line 305 indicating acceptable amplitudes of the spectral disturbances.

Figure 4:
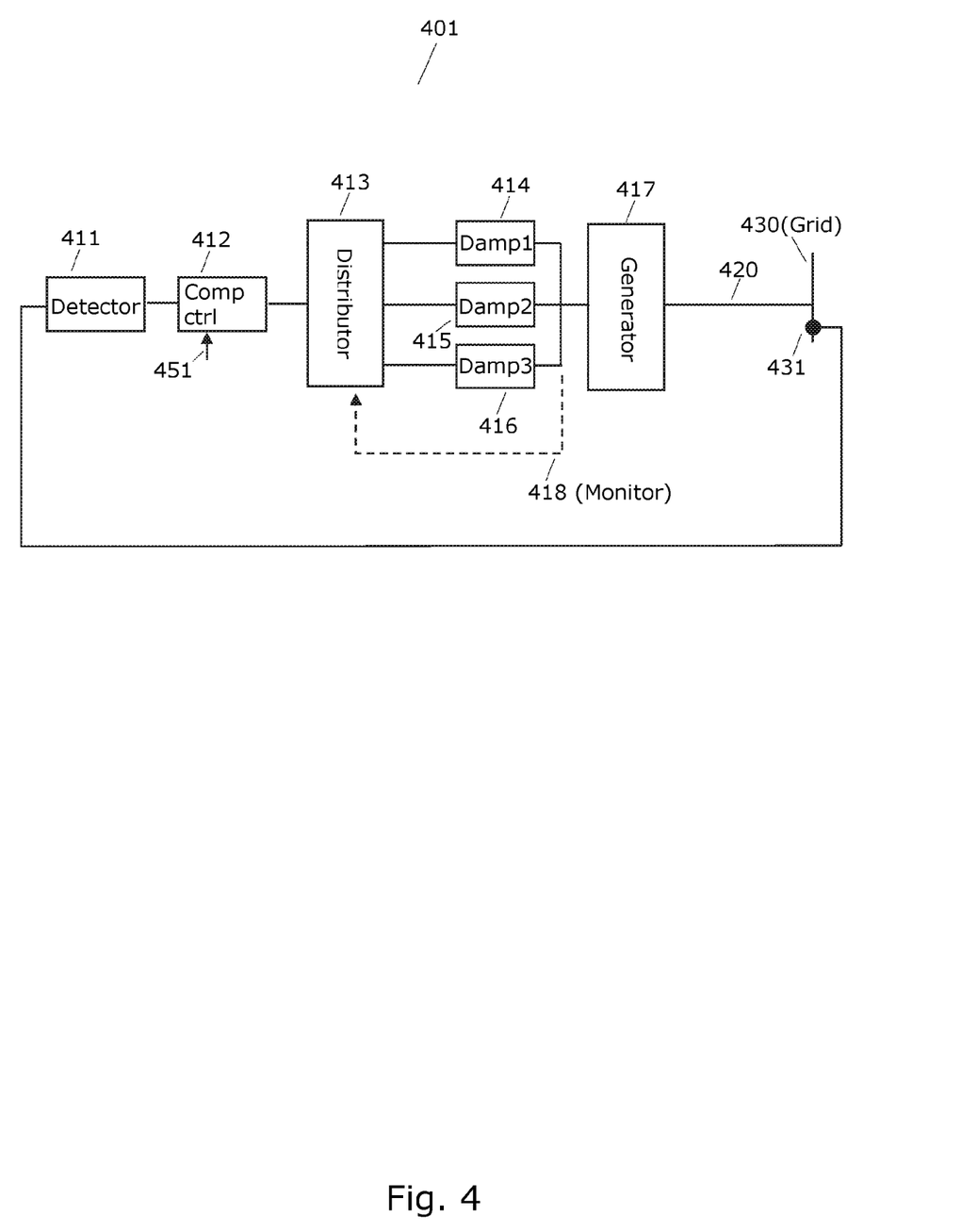
FIG. 4 shows a control system for controlling a one wind turbine for reducing spectral disturbances in an electrical grid.

FIG. 4 shows a control system 401 according to an embodiment of the invention for at least one wind turbine 100 capable of delivering electrical power to an electrical grid 430. The control system is configured for reducing spectral disturbances 203 in the electrical grid 430.

The generator of the wind turbine 100 is connectable with the electrical grid 430, for example via a power line 420. The wind turbine 100 may be configured in different ways, for example as described in connection with FIG. 1.

According to this embodiment, the wind turbine comprises at least one damping controller 414-416 (Damp1-Damp3) configured to compensate structural oscillations of the wind turbine by controlling a torque on the shaft via a control input to the generator. Each of the damping controllers comprises an output for supplying a control signal, e.g. to a torque controller, for generating shaft torque variations by means of the power generator.

The damping control signals from different damping controllers may be combined into a single control signal, e.g. a combined control signal intended for generating shaft torque variations by means of the power generator, e.g. via the torque controller.

Wind turbine component 417 (Generator) principally illustrates systems of the wind turbine, e.g. the torque controller, which receives the damping control signals or the combined control signal and systems which generate electric power and inject the power to the grid 430. Accordingly, wind turbine component 417 includes the coupling between the shaft torque variations induced in response to the damping control signal and the power variations 203 in the electrical power supplied to the electrical grid.

One or more of the damping controllers 414-416 are configured to set a limit of the control action on the shaft dependent on a restriction value or a value derived from a restriction value supplied via an input to each of the damping controllers. By control action is meant e.g. the amplitude of variations in the damping control signal. By limiting the control action the amplitude of torque variations 202 generated in response to the damping control signal and, therefore, the amplitude of the power variations 203 is limited correspondingly.

For example, the damping controller 414 may be configured with an adjustable limit function arranged to set a limit on the output from the damping controller, e.g. the output from a PI control algorithm, so that the control action can be reduced if the output from the control algorithm exceeds the limit. The limit is adjusted in response to the restriction value or in response to a value derived from the restriction value. The damping controller with an integral control-function, e.g. a PI control-function, may be provided with an anti-windup function in order to handle the limit function.

The control system comprises a detector 411 (Detector) configured to determine disturbance information describing an electrical disturbance at a point of measurement 431 electrically connected to the wind turbine. The point of measurement 431 may be located anywhere on an electrical power connection between and including the output of the wind turbine and the grid 430. The point of measurement 431 may alternatively be located anywhere on an electrical power connection between the wind turbine and the grid 430. The point of measurement 431 may comprise a power meter capable of measuring the active power. The disturbance information may be in the form of a value describing variations in the power.

For example, the detector may be configured to determine a low pass filtered power signal (in order to remove the normal AC component, e.g. the 50 Hz component) and to determine the disturbance information as variations in the low pass filtered signal.

In another example, the detector may be configured to determine disturbance information by determining amplitudes of power variations 203 within a frequency spectrum, possibly in the form of an amplitude spectrum 301. For that purpose the detector 411 may be configured with a spectrum analyzer such as a FFT analyzer. Accordingly, the disturbance information may be in the form of a value describing an average amplitude value of the amplitude peaks 302-305 or values describing the amplitudes of different amplitude peaks 302-305 within a frequency spectrum.

The detector may be configured with a threshold function so that that disturbance information is set to e.g. zero in case the determined disturbance information is below a given threshold. For example, if a amplitude peak 302-305 is below the threshold line 305 the disturbance information may be set to a zero or other suitable value.

The control system further comprises a compensation controller 412 (Comp ctrl) configured to determine a restriction value for one of the damping controllers 414-416, and/or configured to determine restriction values for two or more damping controllers. The determined restriction value is outputted by the compensation controller 412 as an output value. The restriction value is determined based on the determined disturbance information from the detector 411.

The compensation controller 412 may be configured to determine the restriction value by comparing a disturbance value determined from the disturbance information with predetermined one or more predetermined threshold values. For example, the compensation controller may be configured to determine the restriction value as a simple binary output value, e.g. 0 and 1, or an ON and OFF value, dependent on a magnitude of the disturbance information, e.g. in comparison with a threshold 305. The compensation controller could also be configured to generate a predetermined number of output values, e.g. three or more values in the interval 0 to 1, e.g. in comparison with a corresponding number of predetermined threshold values.

Alternatively, the compensation controller may comprise a feedback controller, e.g. a PI controller, configured to determine the restriction value dependent on a difference between a disturbance value determined from the disturbance information and a desired disturbance value, i.e. a reference disturbance value provided via input 451. In this way, the restriction value may be determined so that it is proportional to the difference and possibly dependent on a time integrated value of the difference between the disturbance information and the reference.

The damping controller 414 may be configured so that the adjustable limit of the damping controller is set according to a predetermined look-up table or a function defining a relation between the restriction value and the limit of the damping controller, i.e. dependent on a value derived from the restriction value. For example, the damping controller may contain a look-up table defining limits in percentages relative to a nominal limit or absolute limits. As an example, the limit may be set to 100% or zero in case the restriction value is equal to one implying that the damping control action of the affected damping controller 414 is reduced to zero. When the control action is reduced to zero any power variations 203 potentially caused by the affected damping controller are removed.

Generally, the limit of the damping controller may be set as an absolute value, an absolute reduction (e.g. reduce limit by a certain percentage), or a relative value or reduction (e.g. relative to an actual or recent activity level of the damping controller). The absolute value, the absolute reduction or relative change is determined dependent on the restriction value, e.g. by means of a look-up table.

Alternatively, the adjustable limit value of the controller 414-116 may be identical to the restriction value so that a conversion via e.g. a look-up table is not required.

The control system may further comprise a distributor 413 (Distributor) configured to assign the restriction value to one or more of the damping controllers 414 for setting the limit of the control action. Clearly, for wind turbines with only one damping controller 414 a distributor is not required since the assignment of the restriction values may be a fixed assignment or the assignment could be performed e.g. by the compensation controller 412.

For example, the distributor 413 may be configured to assign the restriction value, i.e. the same restriction value, to all damping controllers 414-416 of a wind turbine.

The distributor 413 may also be configured to distribute the restriction value among a plurality of damping controllers. For example, the restriction value may be distributed by assigning a fraction of the restriction value to each of the damping controller. For example, if three damping controllers should be limited, derived restriction values equal to one third of the original restriction value may be distributed among the damping controllers.

The distributor 413 may be configured to select at least one of the damping controllers 414-416 based on the disturbance information and to assign the restriction value (original or derived restriction value) to the selected damping controller.

For example, the disturbance information may be in the form of values describing the amplitudes of different amplitude peaks 302-305 within a frequency spectrum of the power variations 203. Since particular amplitude peaks may be associated with particular damping controllers 414-416, one or more damping controllers may be selected according the levels of the amplitude peaks 302-305.

The control system 401 may further comprise an activity monitor 418 (Monitor) configured to determine compensation values describing levels of damping compensation performed by the damping controllers 414-416. The compensation values may be determined based on output values from the damping controllers 414-416, e.g. from individual damping control signals from different damping controllers 414-416 or from a combined damping control signal, e.g. by determining root-mean-square value(s) of the damping control signals.

The distributor 413 may be configured to select at least one of the damping controllers 414-416 based on damping compensation values from different damping controllers 414-416 and to assign the restriction value to the selected damping controller(s). For example, the restriction value may be a assigned to the damping controller having the largest damping compensation values, or plurality of restriction values may be a assigned or distributed to the damping controllers having the largest damping compensation values.

Figure 5:
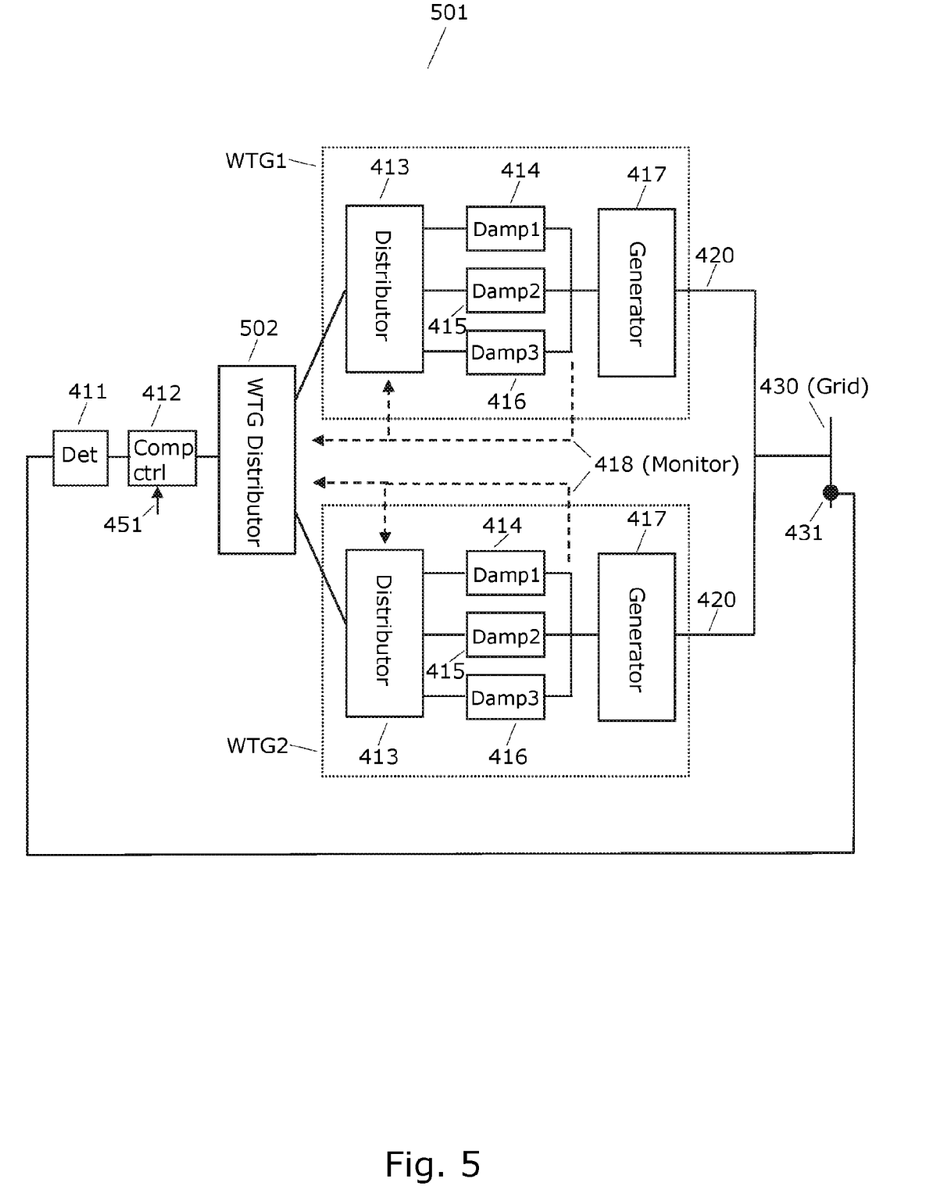
FIG. 5 shows a control system for controlling a plurality of wind turbines for reducing spectral disturbances in an electrical grid.

FIG. 5 illustrates an embodiment of the invention wherein a control system 501 is arranged for controlling a plurality of wind turbines 100 for reducing spectral disturbances in the electrical grid 430. The control system 501 is equivalent to the control system 401 meaning that elements in FIGS. 4 and 5 having the same reference signs perform the same or equivalent functions. The control system 501 mainly differs from control system 401 by having a plurality of distributors 413 (Distributor) and by having an additional wind turbine distributor 502 (WTG distributor). FIG. 5 indicates first and second wind turbines WTG1 and WTG2 which each comprises components 413-417. Alternatively, the distributors 413 could be located externally to the wind turbines, e.g. they could be comprised by a central power plant controller. As seen in FIG. 5, the point of measurement 431 for the electrical disturbance is located in the electrical grid 430. The point of measurement 431 could alternatively be in, or near, the point of connection (PoC) between the two wind turbines WTG1 and WTG2 with the electrical grid (not shown here).

The wind turbine distributor 502 (WTG distributor) is configured to determine wind turbine restriction values based on the restriction value determined by the compensation controller 412 (Comp ctrl). The wind turbine restriction values are determined from a plurality of the wind turbines. The wind turbine distributor 502 is further configured to assign the turbine restriction values to the wind turbines, i.e. to the distributors 413 associated with the wind turbines. Similarly to the embodiment in FIG. 4, each of the distributors 413 are configured to assign the received restriction value, here the received turbine restriction value for the associated of the wind turbine to the one or more damping controllers of the wind turbine for setting the limit of the control action of the one or more damping controllers.

The wind turbine distributor 502 may further be configured to select at least one of the wind turbines based on the disturbance information, and to assign the wind turbine restriction values to the selected wind turbines. The wind turbine distributor 502 may be configured similarly to the distributor 413 to perform selection of wind turbines based on disturbance information. For example, the distributor 502 may be configured to select wind turbines based on the disturbance information containing information about amplitude peaks 302-305 which may be associated with particular damping controllers 414-416. Since damping controllers of different wind turbines may have distinct frequencies of the amplitude peaks 302-305, the wind turbines responsible for the highest amplitude peaks 302-305 may be selected by the wind turbine distributor 502.

Additionally or alternatively, the wind turbine distributor 502 may be configured to select at least one of the wind turbines based on damping compensation values describing levels of damping compensation performed by the damping controllers of the wind turbines, and to assign the wind turbine restriction values to the selected wind turbines.

As shown in FIG. 5, the compensation values determined by the activity monitor 418 (Monitor) may be supplied to the damping controller distributors 413 and/or to the wind turbine distributor 502. Accordingly, based on the compensation values describing levels of damping compensation performed by the damping controllers 414-416, the wind turbine distributor 502 may select the wind turbines having the largest damping compensation values.

The functions of the distributors 413 for selecting at least one of the damping controllers 414-416 of the wind turbines WTG1-WTG2 based on the disturbance information and/or damping compensation values may be hosted by the wind turbines WTG1-WTG2 or by a central control unit such as a power plant controller configured to control a plurality of wind turbines WTG1-WTG2. Accordingly, the wind turbine distributor 502 may additionally comprise the functions of the distributors 413, so that distributors 413 located at each wind turbine may be dispensed with.

One or more of the components 411, 412, 413, 418 of the control system 401 may be comprised by a wind turbine, e.g. by a control system of a wind turbine, or one or more of the components 411, 412, 413, 418 may be located externally to the wind turbine, e.g. one or more of the components may be comprised by a central control unit such as a power plant controller configured to control a plurality of wind turbines. Accordingly, some of the components may be comprised by a wind turbine, and other components may be comprised by a central control unit.

Since the control system 501 is configured for controlling a plurality of wind turbines, at least components 411, 412, 502 may preferably be comprised by a central control unit such as a power plant controller, whereas damping controller distributors 413 may be comprised by the central control unit or by different wind turbines.

Accordingly, a power plant controller configured to control plurality of wind turbines in a wind park may comprise the control system 401 where the distributor 413 is configured to assign restriction values to damping controllers 414-416 of a plurality of the wind turbines, or the power plant controller may comprise the control system 501 or part of the control system 501 such as components 411, 412, 502.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain features are recited in mutually different dependent claims does not indicate that a combination of these features cannot be used to advantage. Any reference signs in the claims should not be construed as limiting the scope.

What is claimed is:

1. A method comprising:
    transmitting a plurality of damping control signals from a plurality of damping controllers of a wind turbine, wherein torque variations are introduced on a shaft connecting a rotor and a generator of the wind turbine to compensate for structural oscillations of the wind turbine;
    determining, responsive to the torque variations, disturbance information describing an electrical disturbance at a point of measurement between the wind turbine and the electrical grid;
    determining a restriction value as a function of a disturbance value determined from the disturbance information; and
    distributing the determined restriction value among the plurality of damping controllers, wherein distributing the determined restriction value comprises:
        communicating a plurality of different restriction values to the different damping controllers,
    wherein, for each of the different damping controllers, receiving the different restriction value configures the respective damping controller to reduce an amplitude of the torque variations introduced by the respective damping controller.

2. A method according to claim 1, further comprising: selecting the plurality of damping controllers based on the disturbance information.

3. A method according to claim 1, further comprising: selecting the plurality of damping controllers based on damping compensation values describing levels of damping compensation performed by the plurality of damping controllers.

4. A method according to claim 3, wherein the damping compensation values are determined based on output values from the plurality of damping controllers.

5. A method according to claim 1, wherein the wind turbine is a first wind turbine of a plurality of wind turbines, the method further comprising:
    determining, based on the restriction value, a plurality of wind turbine restriction values for the plurality of wind turbines; and
    communicating, to at least a second wind turbine of the plurality of wind turbines, a wind turbine restriction value of the plurality of wind turbine restriction values, wherein the wind turbine restriction value communicated to the second wind turbine configures a second damping controller of the second wind turbine to reduce an amplitude of torque variations introduced by the second damping controller.

6. A method according to claim 5, further comprising: selecting the second wind turbine from the plurality of wind turbines based on the disturbance information.

7. A method according to claim 5, further comprising: selecting the second wind turbine from the plurality of wind turbines based on damping compensation values describing levels of damping compensation performed by damping controllers of the plurality of wind turbines.

8. A method according to claim 1, wherein the restriction value is determined as a function of a difference between the disturbance value determined from the disturbance information and a desired disturbance value.

9. A method according to claim 1, wherein the restriction value is determined by comparing the disturbance value determined from the disturbance information with a predetermined one or more threshold values.

10. A method according to claim 1, wherein the disturbance information comprises spectrally resolved disturbance information.

11. The method of claim 1, wherein transmitting the one or more damping control signals comprises:
    receiving a power setpoint signal at a first damping controller of the one or more damping controllers; and
    superimposing a power setpoint variation onto the power setpoint signal to introduce the torque variations.

12. A control system comprising:
    a plurality of damping controllers configured to transmit a plurality of damping control signals, wherein torque variations are introduced on a shaft connecting a rotor and a generator of a wind turbine to compensate structural oscillations of the wind turbine;
    a detector configured to determine, responsive to the torque variations, disturbance information describing an electrical disturbance at a point of measurement between the wind turbine and an electrical grid;
    a compensation controller configured to communicate a restriction value based on the disturbance information, wherein the restriction value is a function of a disturbance value determined from the disturbance information; and
    a distributor configured to distribute the communicated restriction value among the different damping controllers as a plurality of different restriction values,
    wherein, for each damping controller of the plurality of damping controllers, the different restriction value configures the respective damping controller to reduce an amplitude of the torque variations introduced thereby.

13. A control system according to claim 12, wherein the wind turbine is a first wind turbine of a plurality of wind turbines, the control system further comprising:
    a wind turbine distributor configured to communicate, based on the restriction value from the compensation controller, a plurality of wind turbine restriction values for the plurality of wind turbines.

14. A power plant controller adapted to control a plurality of wind turbines in a wind park, the power plant controller comprising:
    a control system according to claim 12.

15. The power plant controller of claim 14, the control system further comprising:
    a wind turbine distributor configured to communicate, based on the restriction value from the compensation controller, a plurality of wind turbine restriction values for the plurality of wind turbines.

16. The control system of claim 12,
    wherein a first damping controller of the plurality of damping controllers is configured to transmit a first damping control signal of the plurality of damping control signals, wherein the first damping control signal has a first spectral range to compensate for a first structural oscillation of the wind turbine, wherein a second damping controller of the plurality of damping controllers is configured to transmit a second damping control signal of the plurality of damping control signals, and wherein the second damping control signal has a second spectral range different than the first spectral range to compensate for a second structural oscillation of the wind turbine.

17. A wind turbine comprising:

a rotor;

a generator connected to the rotor via a shaft; and a control system comprising:

a plurality of damping controllers configured to transmit a plurality of damping control signals, wherein torque variations are introduced on the shaft to compensate structural oscillations of the wind turbine;

a detector configured to determine, responsive to the torque variations, disturbance information describing an electrical disturbance at a point of measurement between the wind turbine and an electrical grid;

a compensation controller configured to communicate a restriction value based on the disturbance information, wherein the restriction value is a function of a disturbance value determined from the disturbance information; and     a distributor configured to distribute the communicated restriction value among the different damping controllers as a plurality of different restriction values,     wherein, for each of the different damping controllers, the different restriction value configures the respective damping controller to reduce an amplitude of the torque variations introduced thereby.

* * * * *